United States Patent
Li

(10) Patent No.: US 6,310,870 B1
(45) Date of Patent: Oct. 30, 2001

(54) METHOD FOR TRANSMITTING HIGH DATA RATE INFORMATION IN CODE DIVISION MULTIPLE ACCESS SYSTEMS

(75) Inventor: Kaiping Li, Mount Freedom, NJ (US)

(73) Assignee: Oki Telecom, Inc., Suwanee, GA (US)

( * ) Notice: Subject to any disclaimer, the term of this patent is extended or adjusted under 35 U.S.C. 154(b) by 0 days.

(21) Appl. No.: 09/050,768

(22) Filed: Mar. 30, 1998

(51) Int. Cl.⁷ ................................................ H04B 7/216
(52) U.S. Cl. .......................... 370/342; 370/465; 375/135
(58) Field of Search .................................. 370/465, 468, 370/335, 342, 479; 375/130, 135, 140, 146

(56) References Cited

U.S. PATENT DOCUMENTS

| | | | |
|---|---|---|---|
| 4,369,516 | 1/1983 | Byrns | 375/110 |
| 5,115,429 | 5/1992 | Hluchyj et al. | 370/84 |
| 5,119,375 | 6/1992 | Paneth et al. | 370/95.1 |
| 5,166,951 | 11/1992 | Schilling | 375/1 |
| 5,357,249 | 10/1994 | Azaren et al. | 341/100 |
| 5,367,523 | 11/1994 | Chang et al. | 370/84 |
| 5,442,625 | 8/1995 | Gitlin et al. | 370/18 |
| 5,442,662 | 8/1995 | Fukasawa et al. | 375/205 |
| 5,515,177 | 5/1996 | Propach et al. | 358/426 |
| 5,517,323 | 5/1996 | Propach et al. | 358/409 |
| 5,539,531 | 7/1996 | Propach et al. | 358/426 |
| 5,566,000 | 10/1996 | Propach et al. | 358/412 |
| 5,568,483 | 10/1996 | Padovani et al. | 370/84 |
| 5,581,575 | * 12/1996 | Zehavi et al. | 375/200 |
| 5,638,412 | 6/1997 | Blakeney, II et al. | 375/377 |
| 5,691,974 | 11/1997 | Zehavi et al. | 370/203 |
| 5,996,384 | * 10/1999 | Felix et al. | 370/465 |
| 6,097,713 | * 8/2000 | Ichihara | 370/335 |
| 6,104,709 | * 8/2000 | Rinchiuso et al. | 370/335 |

* cited by examiner

*Primary Examiner*—Chau Nguyen
*Assistant Examiner*—D. Trinh
(74) *Attorney, Agent, or Firm*—Thomas, Kayden, Horstemeyer & Risley, LLP

(57) ABSTRACT

The present invention provides for a system to achieve a high data rate channel in a CDMA system. According to the preferred embodiment, multiple CDMA data sequences are modulated in parallel by multiple low data rate CDMA channels. Each low data rate CDMA channel digitally delays the CDMA data sequence modulated thereby by a different period of time, where the largest period of time of all the digital delays is less than one-half the period of a single chip of data. The high data rate CDMA channel is created by combining the output of multiple low data rate CDMA channels operating in parallel, thereby resulting in significantly increased data throughput.

10 Claims, 6 Drawing Sheets

METHOD FOR TRANSMITTING HIGH DATA RATE INFORMATION IN CODE DIVISION MULTIPLE ACCESS SYSTEMS

BACKGROUND OF THE INVENTION

The present invention relates generally to the field of high speed data communications, and more specifically, to the field of transmitting high speed data utilizing a low speed data wireless telecommunications medium.

One of the primary standard specifications relevant to the present invention is TIA/EIA/IS-95-A "Mobile Station-Base Station Compatibility Standard for Dual-Mode Wideband Spread Spectrum Cellular System." This code division multiple access (CDMA) industry standard is considered understood by those reasonably skilled in the art of the present invention.

According to the TIA/EIA/IS-95-A standard, a single data channel in the CDMA system can transmit a maximum of 9600 bits (binary digits) of information per second. While this data rate is sufficient for communicating voice information, the data throughput required for digital data transmission is considerably higher. In transmitting digital data, it is often the case that the higher the data rate the better.

One proposed solution combines multiple low data rate channels into a single high data rate channel, thereby exploiting the ability of CDMA systems to combine data signals into a common signal and then later extracting the original data from the common signal. This proposed solution simply modulates the data from each individual data channel by a slightly different phase angle and combines the data from each individual data channel into a high data rate channel. However, by requiring that each data channel be modulated by a modulating signal with a slightly different phase angle, this proposed solution places severe performance requirements upon the analog portion of the CDMA system. For example, if the CDMA system is attempting to combine eight data channels, the difference in the phase angles of the modulating signals cannot be more than 180/8 or 22.5 degrees. In general, the difference in the phase angles of the modulation signals is equal to 180/n degrees where n is the number of individual data channels being combined. In actual practice, due to the difficulties of designing the analog hardware that can perform adequately with such a small phase angle difference, the number of different phase angles used is small. In order to provide a high data rate channel, i.e., combine a large number of low data rate channels, the proposed solution shares the same phase angle between different data channels, leading to a loss of processing gain, hence an overall reduction in the signal to noise ratio.

There is, therefore, a need in the industry for a system addressing these and other related and unrelated problems.

SUMMARY OF THE INVENTION

The present invention provides for a system to achieve a high data rate channel in a CDMA system. According to the preferred embodiment, multiple CDMA data sequences are modulated in parallel by multiple low data rate CDMA channels. Each low data rate CDMA channel digitally delays the CDMA data sequence modulated thereby by a different period of time, where the largest period of time of all the digital delays is less than one-half the period of a single chip of data. The high data rate CDMA channel is created by combining the output of multiple low data rate CDMA channels operating in parallel, thereby resulting in significantly increased data throughput.

After combining the multiple, time delayed, low data rate CDMA channels, the high data rate channel is converted into an analog signal and transmitted over the air. At the receiver side, the received analog signal is converted back into a digital signal and decoded to extract the individual low data rate CDMA channels.

According to the first preferred embodiment of the present invention, each of the individual low data rate CDMA channels are delayed by varying amount of time before being combined into a single high data rate CDMA channel. One of the low data rate CDMA channels, typically the first CDMA channel, is delayed with a delay unit of value zero or effectively no delay.

According to the first preferred embodiment of the present invention, the quadrature (Q) channel data sequence is delayed one half chip period with respect to the in-phase (I) channel data sequence.

According to the first preferred embodiment of the present invention, all I channel data sequences are modulated by a same frequency carrier while all Q channel data sequences are modulated by a same frequency carrier, but different from the carrier modulating the I channel data sequence.

Thus, the present invention provides a system for combining multiple low data rate CDMA channels into a single high data rate CDMA signal without requiring the addition and use of complex analog hardware. An arbitrary number of CDMA channels are combined into a single high data rate CDMA channel through the use of general purpose digital hardware and simple delay elements. Objects, features, and advantages of the present invention will become apparent upon reading and understanding the present specifications, when taken in conjunction with accompanying drawings.

DESCRIPTION OF THE PREFERRED EMBODIMENTS

Figure 1:
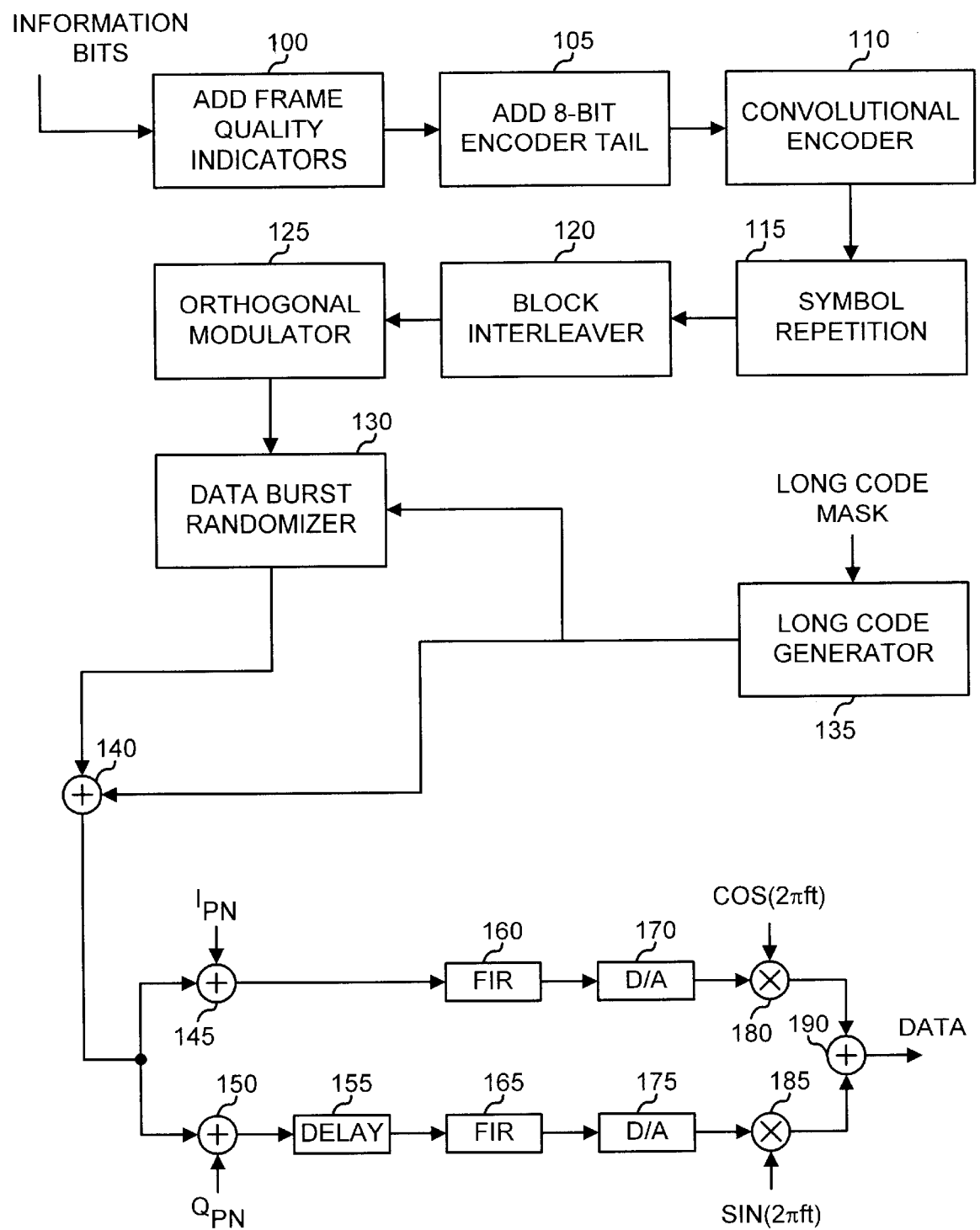
FIG. 1 is a block diagram showing the data channel structure of the reverse (the channel from the wireless telephone to the base station) CDMA channel.
Figure 2:
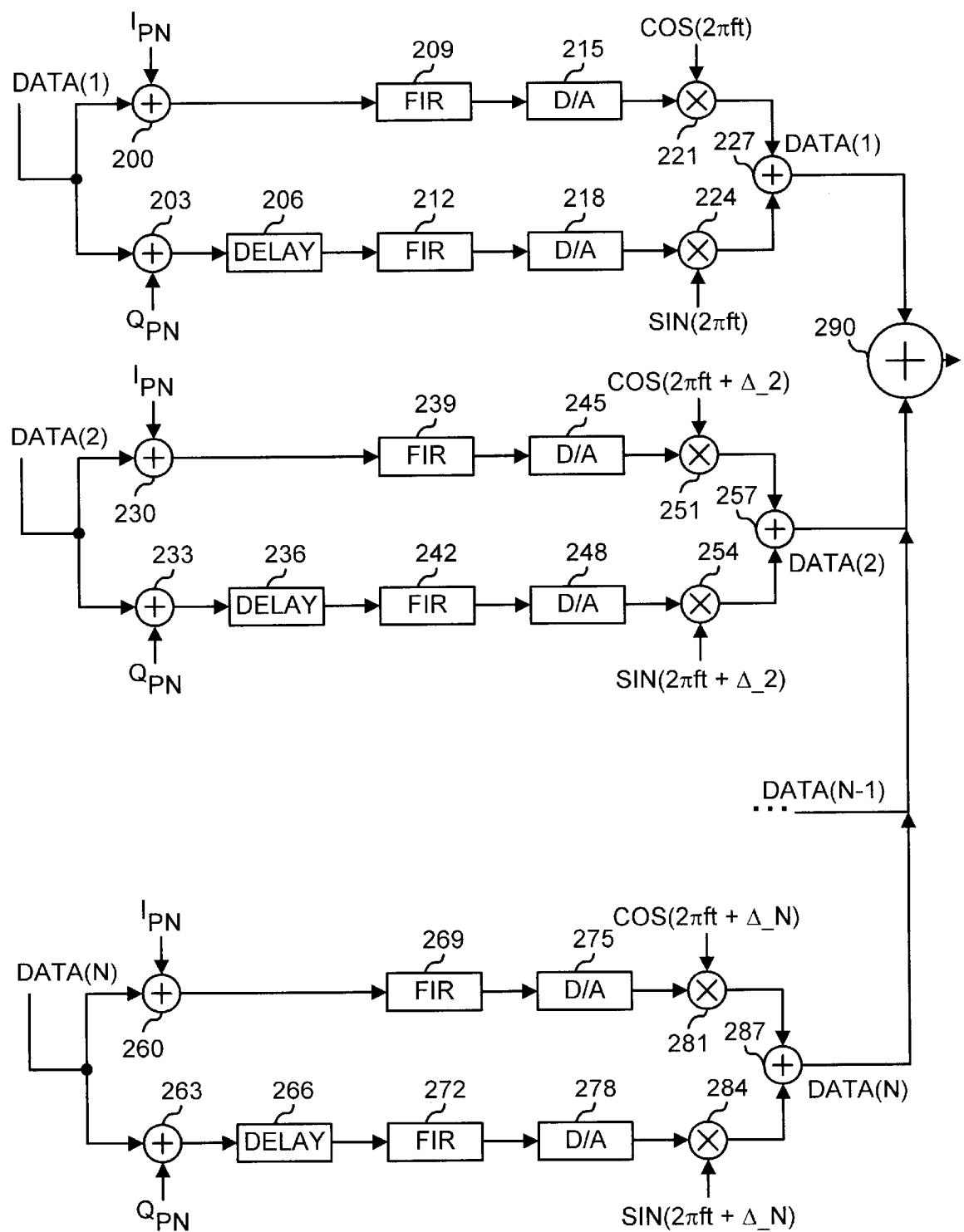
FIG. 2 is a block diagram showing the existing proposal for combining multiple CDMA data channels into a single high data rate channel.

Referring now in greater detail to the drawings in which like numerals represent like components throughout the several views, FIG. 1 shows a block diagram of the data channel structure of the reverse (the data channel from the wireless telephone to the base station) CDMA channel. The data channel structure of the forward CDMA channel is similar. Digital information as generated by the user of the wireless telephone is partitioned into 20 milli-second data frames is combined with frame quality indicators, i.e., cyclic redundancy codes (CRC) for the purposes of error checking in block 100. After being combined with a CRC, the digital data is combined with an eight (8) bit encoder tail. The encoder tail is used to reset a convolutional encoder 110 to a known state. In the convolutional encoder 110, the digital data is encoded using a serially time delayed encoder to increase the coding gain of the digital sequence. After convolutional encoding, the encoded sequence is duplicated in a symbol repetition unit 115, if the digital data is not at the maximum data rate. After symbol repetition, if needed, the digital data is interleaved to reduce the effects of burst errors and then modulated using orthogonal Walsh codes. After Walsh code encoding, the digital data enters a data burst randomizer 130. The data burst randomizer 130 generates masking data as a function of the long code data from a long code generator 135 and is used to make sure that every code symbol inputted into the symbol repetition unit 115 is transmitted only once. The output of the data burst randomizer 130 is exclusive-or'ed with the output of the long code generator 135. The digital data sequence is then split into two sequences with one being exclusive-or'ed with the in-phase (I) pseudo-random number sequence, referred to as $I_{PN}$ sequence, and the other being exclusive-or'ed with the quadrature (Q) pseudo-random number sequence, referred to as the $Q_{PN}$ sequence. The data sequence after being exclusive-or'ed with the $Q_{PN}$ sequence is digitally delayed one half chip period. Both sequences are filtered in an finite impulse response (FIR) filter to allow the passage of only certain frequency ranges. After FIR filtering, the digital data sequences are converted into the analog domain by dual digital to analog converters 170 and 175 and then modulated onto the carrier frequency. After modulation, the data sequences are combined into a single RF signal and is ready for transmission Refer now to FIG. 2 for a block diagram representation of a current solution for providing high data rate CDMA channels by combining several low data rate CDMA channels. FIG. 2 displays only the digital data sequence from the point before where it is split and exclusive-or'ed with the $I_{PN}$ and $Q_{PN}$ pseudo-random number sequences, i.e., from the output of the exclusive-or unit 140 of FIG. 1. FIG. 2 displays the processing for three different CDMA data sequences, but in general, the proposed solution can work with an arbitrary number of CDMA data sequences. The processing for each of the CDMA data sequences is the same and is similar to the process described in FIG. 1, with the difference being that the CDMA data sequences are modulated onto the carrier frequency with slight differences in phase angles. Each CDMA data sequence is modulated with the carrier frequency at a slightly different phase angle, i.e., each CDMA channel uses a unique phase angle. The different phase angles used in the modulation of each of the CDMA data sequences permits the individual sequences to be staggered in time. The staggered sequences prevent large voltage swings in the output of the wireless telephone which could possibly damage the power amplifier in the wireless telephone. After modulation, the data sequences are all combined into one high data rate CDMA channel and transmitted over the air.

Figure 3:
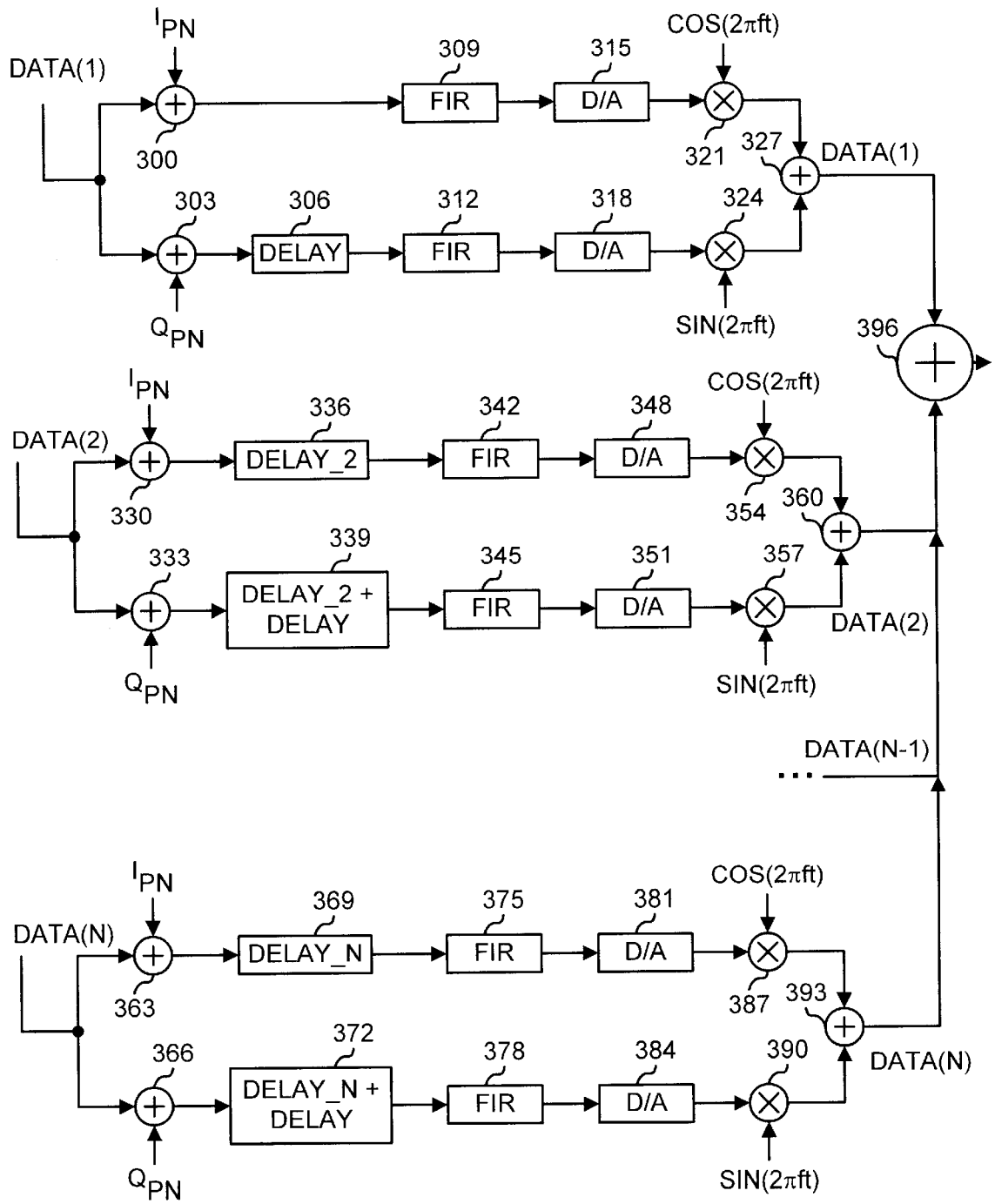
FIG. 3 is a block diagram showing the combining of multiple CDMA data channels into a single high data rate channel, in accordance with the first preferred embodiment of the present invention.

Refer now to FIG. 3 for a block diagram representation of the first preferred embodiment of the present invention concerning the creation of a single high data rate CDMA channel by combining multiple low data rate CDMA channels. FIG. 3 displays only the digital data sequence from the point before where it is split and exclusive-or'ed with the $I_{PN}$ and $Q_{PN}$ pseudo-random number sequences, i.e., from the output of the exclusive-or unit 140 of FIG. 1. FIG. 3 displays the processing for three different CDMA data sequences, but in general, the first preferred embodiment of the present invention can work with an arbitrary number of CDMA data sequences.

It is understood that the CDMA data sequences as contemplated herein may originate in a number of manners. For example, the CDMA data sequences can correspond to an arbitrary number of individual information data streams created by multiple data information sources where each information data stream being assigned to an individual low data rate CDMA channel. Secondly, the CDMA data sequences may be created from a lone high speed data stream originating from a single data information source by distributing the lone high speed data stream is among the individual low data rate CDMA channels. In the second case, the lone high speed data stream has a data rate that is greater than the data throughput capability of the individual low data rate CDMA channels. A third case might be a combination of the first and second examples above in which a predetermined number of low data rate channels are used for individual data streams, while others are used in a distributed manner. In a sense, the low speed data rate CDMA channels act in parallel to be used in the most efficient manner possible depending upon the needs of the particular application.

After each CDMA data sequence is split and exclusive-or'ed with the $I_{PN}$ and $Q_{PN}$ pseudo-random number sequences, each is digitally delayed in a digital delay unit 336 and 339 by a time period that is a unique portion of a chip period. The first CDMA data sequence is delayed by zero (0) chips, effectively not delayed at all. In a system where N CDMA channels are combined, each channel is delayed by 1/(2N)th of a chip period, with the delay for channel M being:

$$\text{DELAY } M = (M-1)*1/(2N) \text{chips}$$

where M is the channel number and N is the total number of CDMA channels being combined into a single channel.

In addition to being delayed by the amount shown in the above expression, the data sequence exclusive-or'ed by the $Q_{PN}$ pseudo-random number sequence is delayed by ½ of a chip period with respect to the data sequence exclusive-or'ed with the $I_{PN}$ pseudo-random number sequence.

After passing through the digital delay units 336 and 339, the digital data sequence is filtered and converted into the analog domain. Each data sequence is modulated by the same carrier frequency all with the same phase angle and then combined into a single high data rate CDMA channel and then transmitted over the air.

Figure 4:
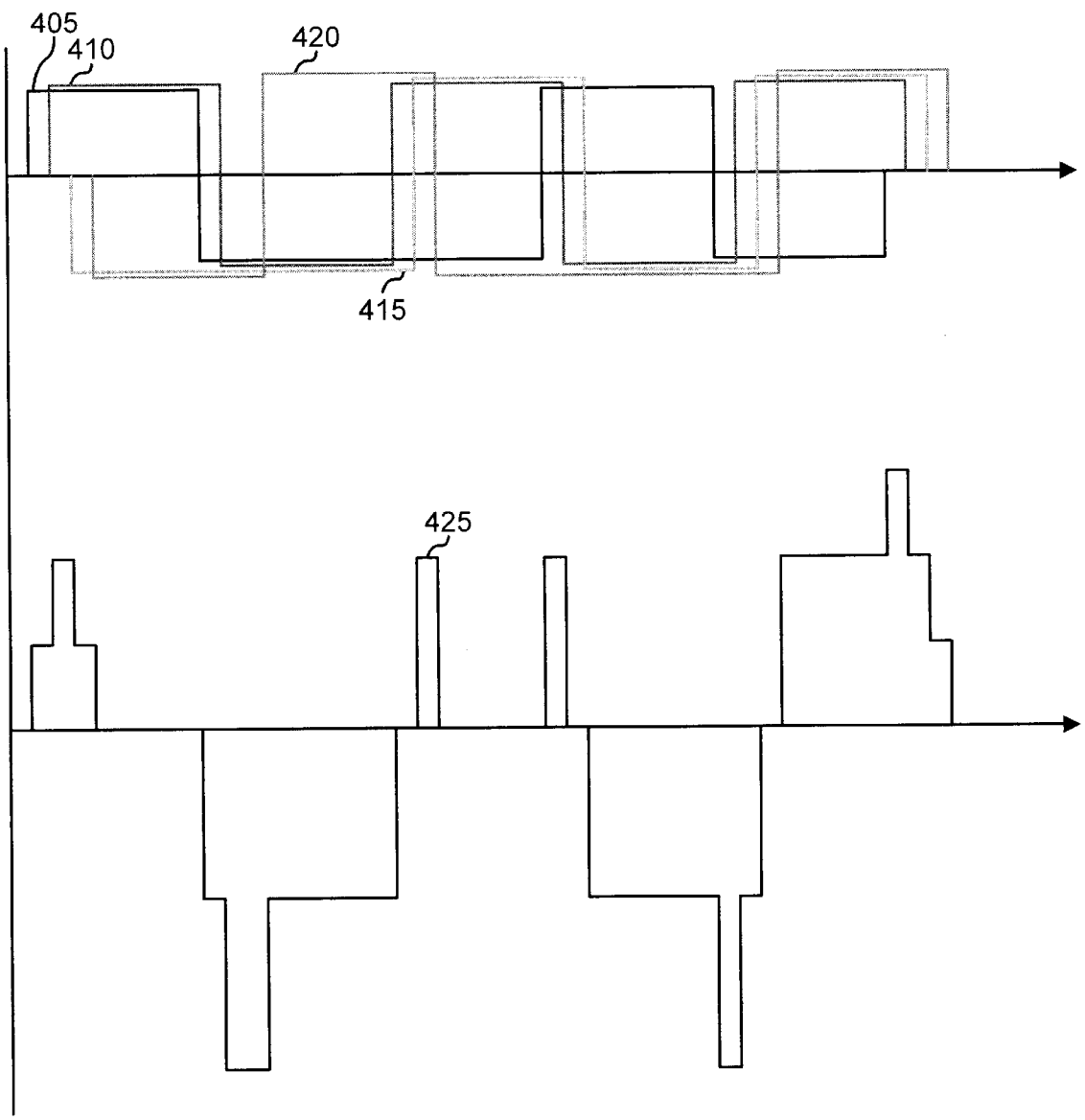
FIG. 4 is a block diagram showing the individual wave forms on each individual CDMA data channel and combined into a single high data rate CDMA data channel, in accordance with the first preferred embodiment of the present invention.

Refer now to FIG. 4 for a block diagram showing the individual wave forms on each individual CDMA data channel and combined into a single high data rate CDMA data channel, in accordance with the first preferred embodiment of the present invention. FIG. 4 displays waveforms 405, 410, 415, and 420 of four digital data sequences of CDMA channels and a combined waveform 425 that is the result of the combination of the four waveforms 405, 410, 415, and 420. The waveforms 405, 410, 415, and 420 are displayed with different magnitudes to make it easier to distinguish the waveforms apart. In the actual implementation, all waveforms will be transmitted with the same magnitude. In the first preferred embodiment of the present invention, a binary zero is transmitted as a positive voltage while a binary one is transmitted as a negative voltage with the same magnitude as the positive voltage used to transmit the binary zero. Waveform 425 displays the results of the addition of the four waveforms 405, 410, 415, and 420 together. Because there are four waveforms being combined, the maximum transmitted voltage for waveform 425 is 4 times the positive voltage used to represent a binary zero and the minimum transmitted voltage for waveform 425 is 4 times the negative voltage used to represent a binary one. Note that when there is a combination of positive voltages and negative voltages, the resulting waveform 425 is simply the addition of the magnitudes of the voltages.

Figure 5:
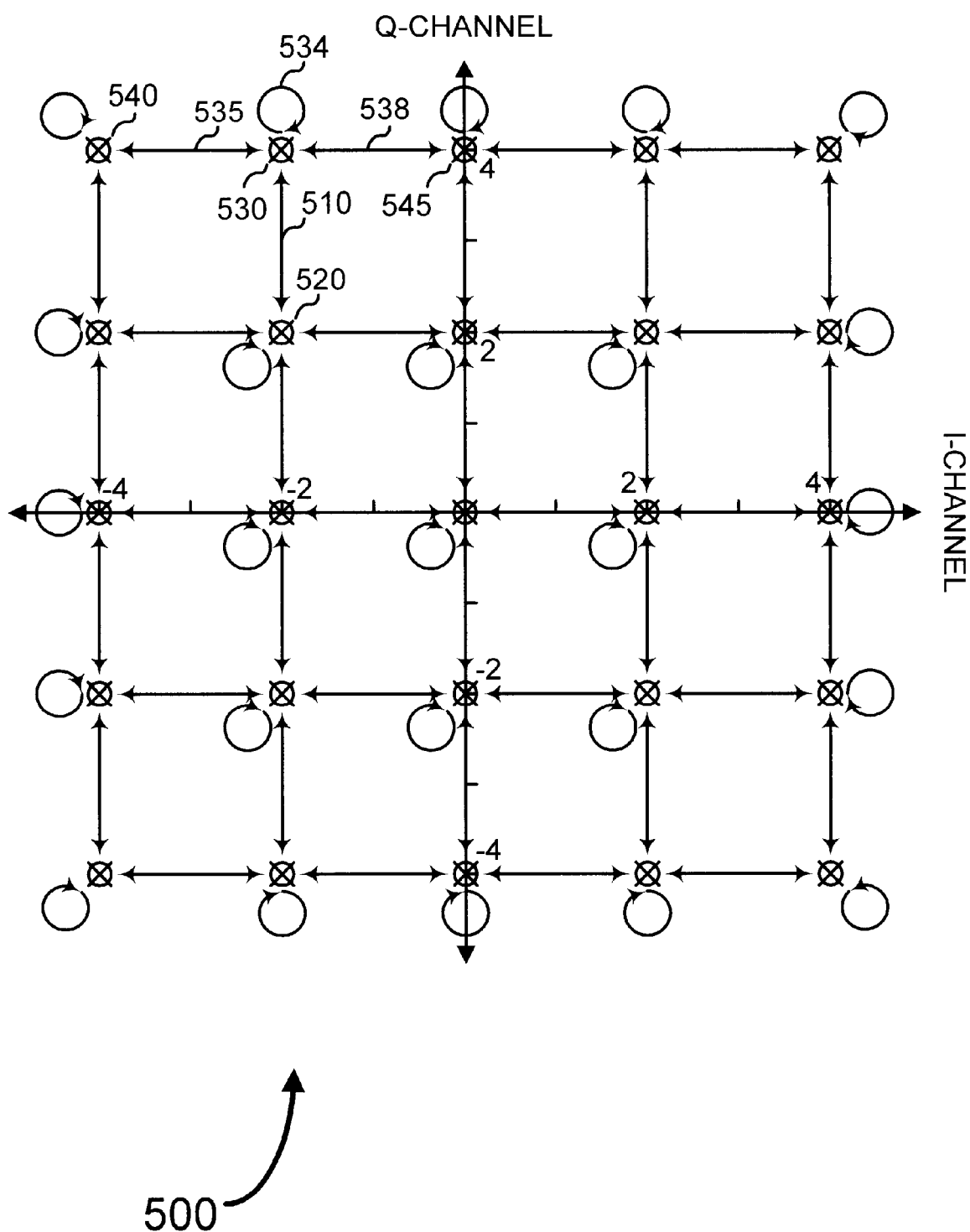
FIG. 5 is a block diagram showing the delayed quadrature phase shift keying (DQPSK) diagram of the combined high data rate CDMA data channel, in accordance with the first preferred embodiment of the present invention.

Refer now to FIG. 5 for a block diagram showing the delayed quadrature phase shift keying (DQPSK) diagram of the combined high data rate CDMA data channel according to the first preferred embodiment of the present invention. FIG. 5 displays an example of the case where four low data rate CDMA channels are combined into a single high data rate CDMA channel. A double arrow arc 510 represents a possible transition between state 520 and another state 530. The I-Channel axis of the diagram displays the possible values for the $I_{PN}$ pseudo-random number modulated data sequence and the Q-Channel axis of the diagram displays the possible values for the $Q_{PN}$ pseudo-random number modulated data sequence. Due to the properties of DQPSK, only one value can change at any given time, hence when the CDMA channel is in a given state 530, there are only four possible transitions 510, 534, 535, and 538 that are allowed and there are only four possible next states 520, 530, 540, and 545.

Figure 6:
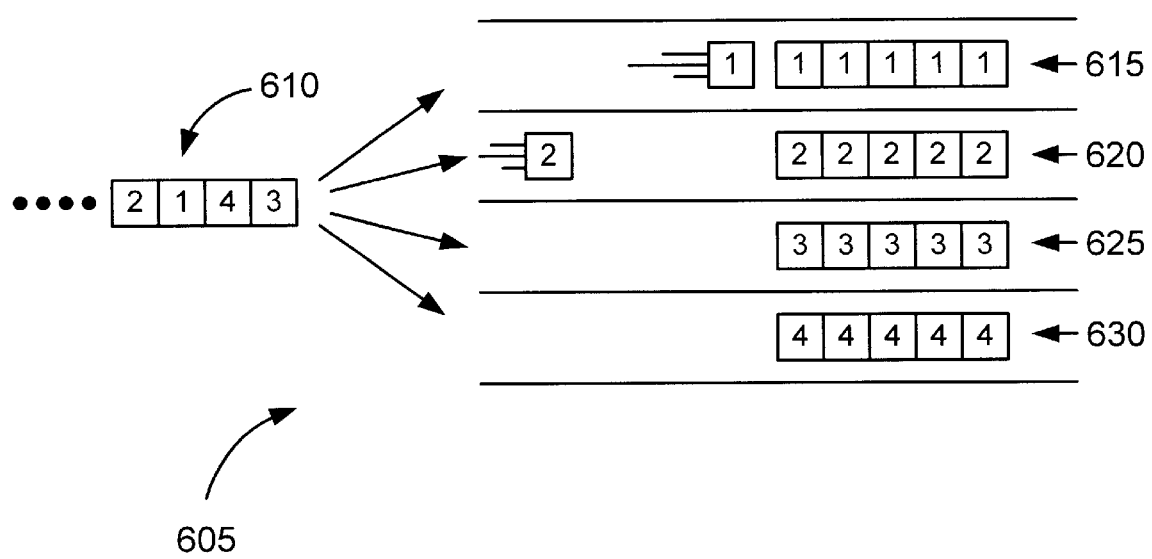
FIG. 6 is a block diagram showing the distribution of a high speed data stream among the low data rate CDMA channels.

Finally, turning to FIG. 6, shown is a block diagram 605 of the distribution of a high speed data stream 610. According to the preferred embodiment, data from the information data input stream 610 is distributed among the low data rate CDMA channels 615, 620, 625, and 630. On the receiver side the high speed data stream 610 is recreated from the data from each of the low data rate CDMA channels 615, 620, 625, and 630. In this manner, the present invention accomodates a data rate of multiple times faster than the throughput capacity of the low data rate CDMA channels 615, 620, 625, and 630.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the corresponding structures, materials, acts, and equivalents of any means- or step-plus-function elements in the claims below are hereby described to include any structure, material, or acts for performing the claimed functions in combination with other claimed elements as specifically claimed.

I claim:

1. A system for providing a high data rate code-division multiple access (CDMA) channel, comprising:
   a plurality of low data rate CDMA channels acting in parallel;
   a plurality of unique digital delays, each unique digital delay being associated with one of the plurality of low data rate CDMA channels and being a unique time portion of a chip period, the unique digital delays delaying a CDMA data sequence modulated by the associated low data rate CDMA channel by a predetermined amount of time, where the unique digital delays are calculated by $$\left(\frac{M-1}{2N}\right)C,$$

where M is the number of the channel, and N is the total number of CDMA channels, and C is the chip period; and
   a transmitter which transmits the sum of the CDMA data sequences as a high data rate CDMA channel.

2. The system of claim 1, wherein the CDMA data sequence modulated by the associated low data rate CDMA channel is generated by the distribution of a high speed information data stream from a single data source, the data rate of the high speed information data being greater than the data throughput capability of the low data rate CDMA channels.

3. A system for providing a high data rate code-division multiple access (CDMA) channel, comprising:
   a plurality of low data rate CDMA channels acting in parallel;
   means for digitally delaying a plurality of CDMA data sequences modulated by the plurality of low data rate CDMA channels, each of the CDMA data sequences being delayed by a unique time period, wherein the unique time period is a unique time portion of a chip period and is calculated by $$\left(\frac{M-1}{2N}\right)C,$$

where M is the number of the channel, and N is the total number of CDMA channels, and C is the chip period; and
   a transmitter which transmits the sum of the CDMA data sequences as a high data rate CDMA channel.

4. The system of claim 3, further comprising means for generating the plurality of CDMA data sequences which includes means for distributing a high speed information data stream from a single data source among the plurality of low data rate CDMA channels, the data rate of the high speed information data stream being greater than the data throughput capability of the low data rate CDMA channels.

5. A system for providing a high data rate code-division multiple access (CDMA) channel, comprising:
   a plurality of low data rate CDMA channels;
   a common Walsh code employed by the low data rate CDMA channels to generate a covered bit stream in each of the low data rate CDMA channels from a corresponding information data bit stream;
   an in-phase (I) and quadrature (Q) pseudo-random number sequence employed by the low data rate CDMA channels to modulate the covered bit stream, thereby generating in-phase and quadrature bit streams;
   a unique digital delay associated with each individual low data rate CDMA channel imposed upon the in-pulse and quadrature bit streams, wherein the unique digital delay is a unique time portion of a chip period associated with the Walsh code, where the unique digital delay assigned to each individual CDMA channel is calculated by $$\left(\frac{M-1}{2N}\right)C,$$

wherein M is the number of the channel, and N is the total number of CDMA channels, and C is the chip period; and a transmission output generated by the modulation of a radio frequency carrier by the in-pulse and quadrature bit stream in each of the low data rate CDMA channels.

6. A system of claim 5, further comprising a multiplexer distributing a high speed information data stream input among the plurality of low data rate CDMA channels, wherein the data rate of the high speed information data stream input is greater than the data throughput capability of the low data rate CDMA channels.

7. A system for providing a high data rate code-division multiple access (CDMA) channel, comprising:

a plurality of low data rate CDMA channels;

means associated with each low data rate CDMA channel for generating a covered bit stream from a corresponding information bit stream assigned to the low data rate CDMA channel;

means associated with each low data rate CDMA channel for generating in-pulse (I) and quadrature (Q) bit streams from the covered bit stream;

means associated with each low data rate CDMA channel for digitally delaying the I and Q bit streams by a unique time period assigned to each low data rate CDMA channel, wherein the unique time period assigned to each low data rate CDMA channel is a unique time portion of a chip period of a Walsh code, wherein the unique time period assigned to each individual CDMA channel is calculated by $$\left(\frac{M-1}{2N}\right)C,$$

where M is the number of the channel, and N is the total number of CDMA channels, and C is the chip period;

means associated with each low data rate CDMA channel for modulating a common radio frequency carrier with the digitally delayed I and the Q bit streams; and means for transmitting the sum of the modulated radio frequency carriers from each low data rate CDMA channel.

8. The system of claims 7, further comprising means for distributing a high speed information data stream input among the plurality of low data rate CDMA channels, wherein the data rate of the high speed information data stream input is greater than the data throughput capability of the low data rate CDMA channels.

9. A method for providing a high data rate code-division multiple access (CDMA) channel, comprising the steps of:

defining a plurality of low data rate CDMA channels acting in parallel;

modulating a plurality of CDMA data sequences with the plurality of low data rate CDMA channels;

delaying each of the CDMA data sequences modulated by the plurality of low data rate CDMA channels by a unique time period;

defining the unique time period to be unique time portion of a chip period defined as $$\left(\frac{M-1}{2N}\right)C,$$

where M is the number of the channel, and N is the total number of CDMA channels, and C is the chip period; and transmitting the sum of the delayed CDMA data sequences.

10. The system of claim 9, further comprising the steps of distributing a high speed information data stream from a single data source among the plurality of low data rate CDMA channels, the data rate of the high speed information data stream being greater than the data throughput capability of the low data rate CDMA channels.

* * * * *